United States Patent
Aksit et al.

(10) Patent No.: US 12,412,329 B2
(45) Date of Patent: Sep. 9, 2025

(54) CREATING CINEMAGRAPHS FROM A SINGLE IMAGE

(71) Applicant: Adobe Inc., San Jose, CA (US)

(72) Inventors: Duygu Ceylan Aksit, Mountain View, CA (US); Hugo Bertiche Argila, Castelldefels (ES); Niloy Jyoti Mitra, London (GB); Kuldeep Kulkarni, Bengaluru (IN); Chun Hao Huang, London (GB); Yangtuanfeng Wang, London (GB)

(73) Assignee: Adobe Inc., San Jose, CA (US)

( * ) Notice: Subject to any disclaimer, the term of this patent is extended or adjusted under 35 U.S.C. 154(b) by 288 days.

(21) Appl. No.: 18/325,645

(22) Filed: May 30, 2023

(65) Prior Publication Data
US 2024/0404155 A1     Dec. 5, 2024

(51) Int. Cl.
*G06T 13/00*     (2011.01)
*G06N 3/045*     (2023.01)
*G06T 11/60*     (2006.01)

(52) U.S. Cl.
CPC ............. *G06T 13/00* (2013.01); *G06N 3/045* (2023.01); *G06T 11/60* (2013.01); *G06T 2210/16* (2013.01)

(58) Field of Classification Search
CPC ......... G06N 3/045; G06T 13/40; G06T 13/00; G06T 11/60; G06T 13/80; G06T 2210/16; G06T 2210/44
See application file for complete search history.

(56) References Cited

U.S. PATENT DOCUMENTS

| | | | |
|---|---|---|---|
| 2009/0033674 A1* | 2/2009 | Murrah | G06T 15/04 345/584 |
| 2017/0278289 A1* | 9/2017 | Marino | G06T 7/536 |
| 2018/0181802 A1* | 6/2018 | Chen | G06V 10/764 |
| 2023/0306686 A1* | 9/2023 | Zangenehpour | G06T 7/11 |

(Continued)

OTHER PUBLICATIONS

Aleksander Holynski, Brian L Curless, Steven M Seitz, and Richard Szeliski. Animating pictures with eulerian motion fields. In Proceedings of the IEEE/CVF Conference on Computer Vision and Pattern Recognition, pp. 5810-5819, 2021.

(Continued)

*Primary Examiner* — Xilin Guo
(74) *Attorney, Agent, or Firm* — Keller Preece PLLC

(57) ABSTRACT

The present disclosure relates to systems, methods, and non-transitory computer readable media that utilizes neural networks to generate cinemagraphs from single RGB images. For example, the cyclic animation system includes a cyclic animation neural network trained with synthetic data, wherein different wind effects can be replicated using physically based simulations to create cyclic videos more efficiently. More specifically, the cyclic animation system generalizes a solution by operating in the gradient domain and using surface normal maps. Because normal maps are invariant to appearance (color, texture, illumination, etc.), the gap between synthetic and real data distribution in the normal map space is smaller than in the RGB space. The cyclic animation system performs a reshading approach that synthesizes RGB pixels from the original image and the animated normal maps to create plausible changes to the real image to create the cinemagraph.

20 Claims, 12 Drawing Sheets

(56) References Cited

U.S. PATENT DOCUMENTS

2024/0173620 A1* 5/2024 Lewin ............... G06T 15/04

OTHER PUBLICATIONS

Aliaksandr Siarohin, Stephane Lathuiliere, Sergey Tulyakov, Elisa Ricci, and Nicu Sebe. First order motion model for image animation. In *Conference on Neural Information Processing Systems (NeurIPS)*, Dec. 2019.

Andreas Blattmann, Timo Milbich, Michael Dorkenwald, and Bjorn Ommer. ipoke: Poking a still image for controlled stochastic video synthesis, 2021.

Andreas Blattmann, Timo Milbich, Michael Dorkenwald, and Bjorn Ommer. Understanding object dynamics for interactive image-to-video synthesis. In Computer Vision and Pattern Recognition (CVPR).

Aniruddha Mahapatra and Kuldeep Kulkarni. Controllable animation of fluid elements in still images. In Proceedings of the IEEE/CVF Conference on Computer Vision and Pattern Recognition, pp. 3667-3676, 2022.

Arno Schodl, Richard Szeliski, David H Salesin, and Irfan Essa. Video textures. In Proceedings of the 27th annual conference on Computer graphics and interactive techniques, pp. 489-498, 2000.

Aseem Agarwala, Ke Colin Zheng, Chris Pal, Maneesh Agrawala, Michael Cohen, Brian Curless, David Salesin, and Richard Szeliski. Panoramic video textures. In ACM SIG-GRAPH, SIGGRAPH '05, p. 821-827, 2005.

Ashish Vaswani, Noam Shazeer, Niki Parmar, Jakob Uszkoreit, Llion Jones, Aidan N Gomez, Łukasz Kaiser, and Illia Polosukhin. Attention is all you need. In Conference on Neural Information Processing Systems (NeurIPS), pp. 5998-6008, 2017.

Blender Online Community. Blender—a 3D modelling and rendering package. Blender Foundation, Stichting Blender Foundation, Amsterdam, 2018.

Chen Qian Kwan-Yee Lin Hongsheng Li Siming Fan, Jing-tan Piao. Simulating fluids in real-world still images. arXiv preprint, arXiv:2204. 11335, 2022.

Chia-Chi Cheng, Hung-Yu Chen, and Wei-Chen Chiu. Time flies: Animating a still image with time-lapse video as reference. In Proceedings of the IEEE/CVF Conference on Computer Vision and Pattern Recognition, pp. 5641-5650, 2020.

Ekta Prashnani, Maneli Noorkami, Daniel Vaquero, and 968 Pradeep Sen. A phase-based approach for animating images using video examples. Comput. Graph. Forum, 36(6):303-311, Sep. 2017.

Elizaveta Logacheva, Roman Suvorov, Oleg Khomenko, Anton Mashikhin, and Victor Lempitsky. Deeplandscape: Adversarial modeling of landscape videos. In European Conference on Computer Vision (ECCV), Aug. 2020.

Gwangbin Bae, Ignas Budvytis, and Roberto Cipolla. Estimating and exploiting the aleatoric uncertainty in surface normal estimation. In International Conference on Computer Vision (ICCV), 2021.

Hugo Bertiche, Meysam Madadi, and Sergio Escalera. Cloth3d: Clothed 3d humans. In European Conference on Computer Vision (ECCV), p. 344-359, 2020.

James Tompkin, Fabrizio Pece, Kartic Subr, and Jan Kautz. Towards moment imagery: Automatic cinemagraphs. In CVMP, pp. 87-93, 2011.

Jiamin Bai, Aseem Agarwala, Maneesh Agrawala, and Ravi Ramamoorthi. Selectively de-animating video. 31(4), Jul. 2012.

Jiangning Zhang, Chao Xu, Liang Liu, Mengmeng Wang, Xia Wu, Yong Liu, and Yunliang Jiang. Dtvnet: Dynamic time-lapse video generation via single still image. In Euro-pean Conference on Computer Vision (ECCV), pp. 300-315, 2020.

Jing Liao, Mark Finch, and Hugues Hoppe. Fast computation of seamless video loops. ACM Transactions on Graphics (TOG), 34(6):1-10, 2015.

Katherine L. Bouman, Bei Xiao, Peter Battaglia, and William T. Freeman. Estimating the material properties of fabric from video. In International Conference on Computer Vision (ICCV), pp. 1984-1991, 2013.

Kiran S. Bhat, Steven M. Seitz, Jessica K. Hodgins, and Pradeep K. Khosla. Flow-based video synthesis and editing. *Transactions on Graphics (TOG)*, 23(3):360-363, Aug. 2004.

Makoto Okabe, Ken Anjyo, Takeo Igarashi, and Hans-Peter Seidel. Animating pictures of fluid using video examples. Computer Graphics Forum, 28(2):677-686, 2009.

Mei-Chen Yeh and Po-Yi Li. An approach to automatic creation of cinemagraphs. In ACM MM, p. 1153-1156, New York, NY, USA, 2012. Association for Computing Machinery.

Meng Zhang, Tuanfeng Wang, Duygu Ceylan, and Niloy J Mitra. Deep detail enhancement for any garment. In Computer Graphics Forum (CGF), vol. 40, pp. 399-411, 1026 2021.

Michael Dorkenwald, Timo Milbich, Andreas Blattmann, Robin Rombach, Konstantinos G. Derpanis, and Bjorn Om-mer. Stochastic image-to-video synthesis using cinns, 2021.

Rajat Arora and Yong Jae Lee. Singan-gif: Learning a generative video model from a single gif. 2021.

Richard Zhang, Phillip Isola, Alexei A Efros, Eli Shechtman, and Oliver Wang. The unreasonable effectiveness of deep features as a perceptual metric. In CVPR, 2018.

Sean Bell, Kavita Bala, and Noah Snavely. Intrinsic images in the wild. ACM Trans. on Graphics (SIGGRAPH), 33(4), 2014.

Tamar Rott Shaham, Tali Dekel, and Tomer Michaeli. Singan: Learning a generative model from a single natural image. In Computer Vision (ICCV), IEEE International Conference on, 2019.

Tavi Halperin, Hanit Hakim, Orestis Vantzos, Gershon Hochman, Netai Benaim, Lior Sassy, Michael Kupchik, Ofir Bibi, and Ohad Fried. Endless loops: Detecting and animating periodic patterns in still images. Transactions on Graphics (TOG), 40(4), Aug. 2021.

Thomas Unterthiner, Sjoerd van Steenkiste, Karol Kurach, Raphael Marinier, Marcin Michalski, and Sylvain Gelly. Towards accurate generative models of video: A new metric & challenges. arXiv preprint arXiv:1812.01717, 2018.

Tianfan Xue, Jiajun Wu, Katherine L Bouman, and William T Freeman. Visual dynamics: Probabilistic future frame synthesis via cross convolutional networks. In Conference on Neural Information Processing Systems (NeurIPS), 2016.

Vincent Couture, Michael S Langer, and Sebastien Roy. Panoramic stereo video textures. In 2011 International Conference on Computer Vision, pp. 1251-1258. IEEE, 2011.

Wei Xiong, Wenhan Luo, Lin Ma, Wei Liu, and Jiebo Luo. Learning to generate time-lapse videos using multi-stage dynamic generative adversarial networks. In *Computer Vision and Pattern Recognition (CVPR)*, Jun. 2018.

Yaohui Wang, Di Yang, Francois Bremond, and Antitza Dantcheva. Latent image animator: Learning to animate im-ages via latent space navigation. In International Conference on Learning Representations (ICLR), 2022.

Yijun Li, Chen Fang, Jimei Yang, Zhaowen Wang, Xin Lu, and Ming-Hsuan Yang. Flow-grounded spatial-temporal video prediction from still images. In European Conference on Computer Vision (ECCV), 201.

Yuki Endo, Yoshihiro Kanamori, and Shigeru Kuriyama. Animating landscape: Self-supervised learning of decoupled motion and appearance for single-image video synthesis. Transactions on Graphics (TOG), 38(6), Nov. 2019.

Yung-Yu Chuang, Dan B Goldman, Ke Colin Zheng, Brian Curless, David H. Salesin, and Richard Szeliski. Animating pictures with stochastic motion textures. ACM Trans. Graph., 24(3):853-860, Jul. 2005.

Zachary Teed and Jia Deng. Raft: Recurrent all-pairs field transforms for optical flow. In European conference on computer vision, pp. 402-419. Springer, 2020.

Zhou Wang, Alan C Bovik, Hamid R Sheikh, and Eero P Simoncelli. Image quality assessment: from error visibility to structural similarity. *IEEE transactions on image processing*, 13(4):600-612, 2004.

(56) References Cited

OTHER PUBLICATIONS

Zicheng Liao, Neel Joshi, and Hugues Hoppe. Automated video looping with progressive dynamism. Transactions on Graphics (TOG), 32(4), Jul. 2013.

Ziwei Liu, Ping Luo, Shi Qiu, Xiaogang Wang, and Xiaoou Tang. Deepfashion: Powering robust clothes recognition and retrieval with rich annotations. In Proceedings of IEEE Conference on Computer Vision and Pattern Recognition (CVPR), Jun. 2016.

Zorah Lahner, Daniel Cremers, and Tony Tung. Deepwrinkles: Accurate and realistic clothing modeling. In European Conference on Computer Vision (ECCV), Sep. 2018.

\* cited by examiner

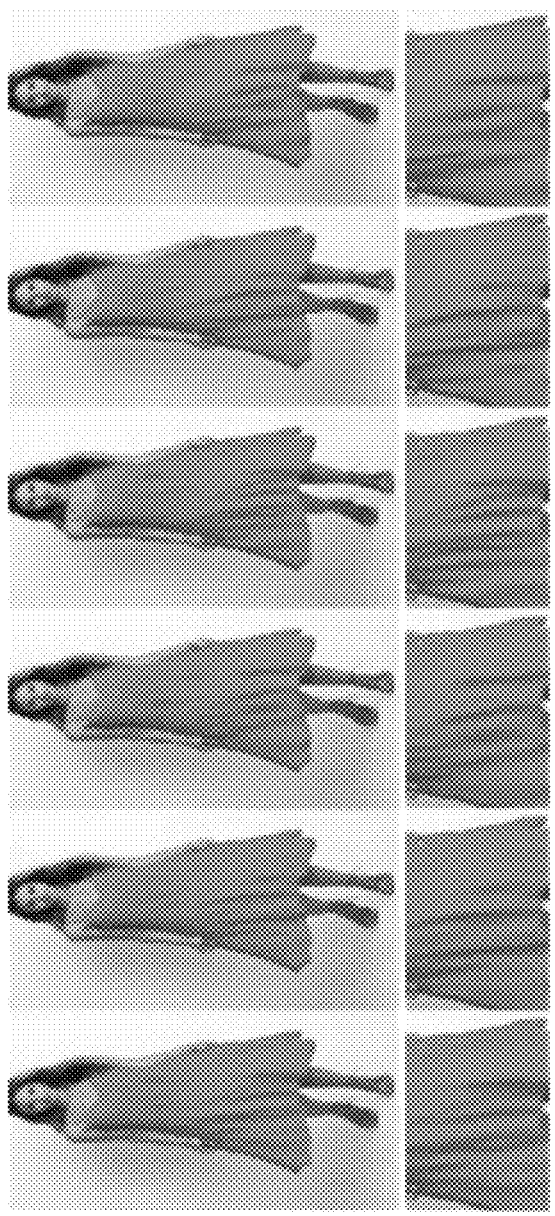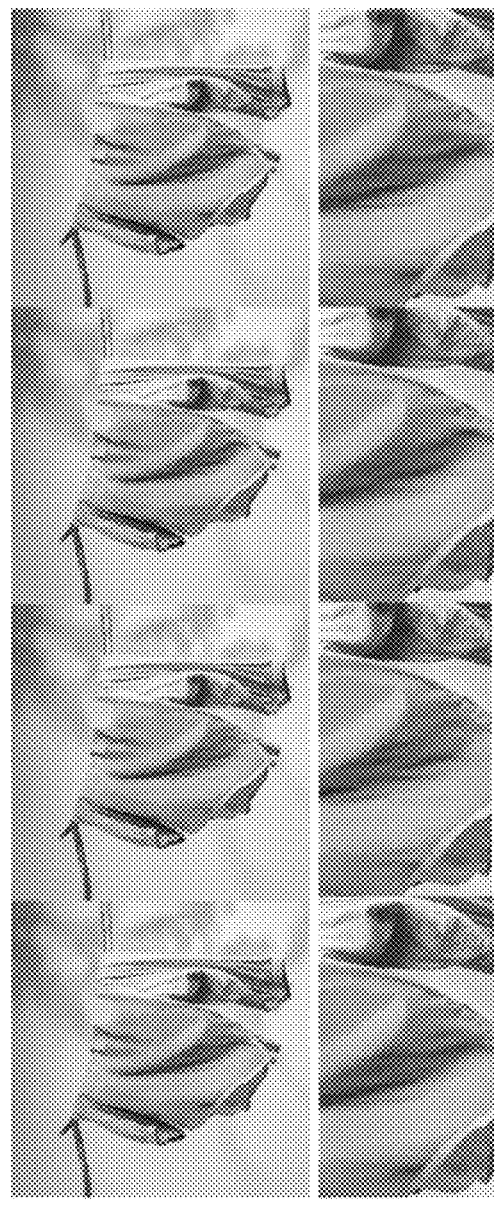

CREATING CINEMAGRAPHS FROM A SINGLE IMAGE

BACKGROUND

Recent years have seen significant advancements in computer-implemented models for creating image animations. Due to the prevalence, ease of use, and capability of image editing software, it is common for users to edit images. Images, particularly images posted online, are sometimes modified to create interest and engagement. Unfortunately, such modifications are often tedious and typically require manual authoring by artists to alter images to reflect subtle and repeated movements. Accordingly, many conventional systems have a number of shortcomings with regard to efficiency, accuracy, and flexibility with respect to generating cinemagraphs.

SUMMARY

This disclosure describes one or more embodiments of systems, methods, and non-transitory computer readable media that solve one or more problems in the art with a cyclic animation system that creates a cinemagraph by generating a looped video sequence directly from a single digital image. In one or more implementations, the cyclic animation system operates in the gradient domain and uses surface normal maps. For example, the cyclic animation system generates a surface normal map of an input image. From this surface normal map, the cyclic animation neural network synthesizes geometric and resultant appearance variations in the surface normal map to create a sequence of warped surface normal maps that simulate a portion of the image interacting with wind. Furthermore, the cyclic animation system provides realism by generating a cinemagraph that is consistent with the sequence of warped surface normal maps. Notably, in one or more implementations, the cyclic animation system utilizes a cyclic neural network formulation that directly outputs looped videos, with target time periods and wind variation, that do not suffer from noticeable temporal jumps.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which:

FIGS. 8A-8B illustrate the accuracy and plausibility of visual representations of image manipulations generated by the cyclic animation system in accordance with one or more embodiments;

DETAILED DESCRIPTION

Figure 1:
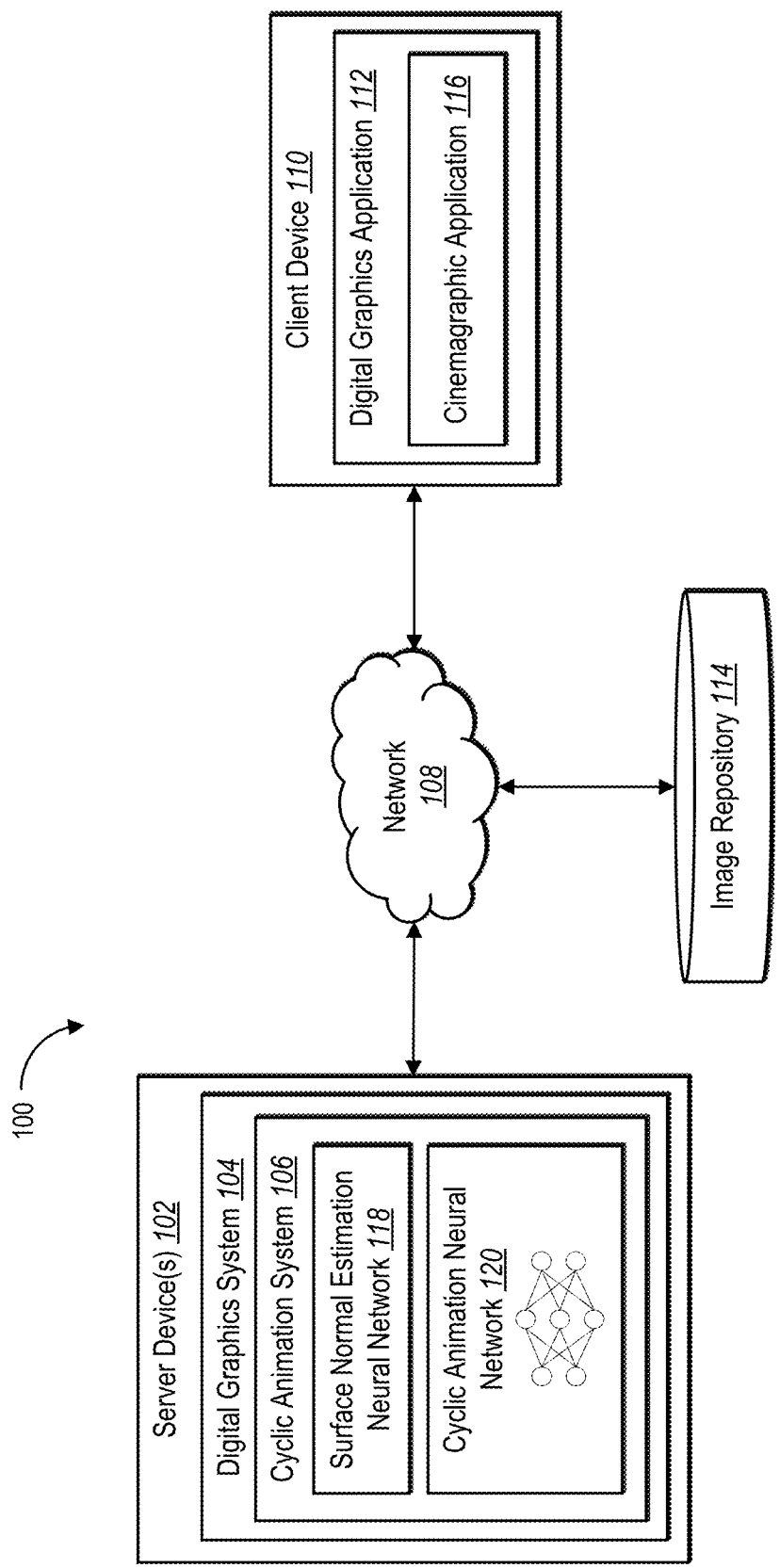
FIG. 1 illustrates an example system environment in which a cyclic animation system operates in accordance with one or more embodiments.

This disclosure describes one or more embodiments of a cyclic animation system that utilizes neural networks to generate cinemagraphs from a single digital image. For example, the cyclic animation system includes a cyclic animation neural network that is able to apply different wind effects physically based simulations to create cyclic videos more efficiently. More specifically, in one or more implementations, the cyclic animation system generalizes realistic cinemagraphs by operating in the gradient domain and using surface normal maps. Because normal maps are invariant to appearance (color, texture, illumination, etc.), the gap between synthetic and real data distribution in the normal map space is smaller than in the RGB space. The cyclic animation system performs a reshading approach that synthesizes RGB pixels from the original image and the animated normal maps to create plausible changes to the real image to create the cinemagraph.

In one or more implementations, the cyclic animation system includes a surface normal estimation neural network. In particular, the surface normal estimation neural network generates a surface normal map of an input image as a suitable representation from which to synthesize geometric and resultant appearance variations as a portion of the image interacts with wind. Indeed, the cyclic animation system utilizes surface normal maps that are robust to lighting or appearance variations when compared to the source images. Moreover, surface normal maps are indicative of the underlying garment geometry (e.g., folds and wrinkles) and hence provide a suitable representation to synthesize consistent geometric and resultant appearance variations as the garment interacts with the wind.

In one or more implementations, the cyclic animation system utilizes a cyclic animation neural network. The cyclic animation neural network, given an input surface normal map and an input wind direction, generates plausible garment animation and to synthesize a cyclic animation sequence comprising a sequence of modified normal maps. In one or more implementations, the cyclic animation neural network synthesizes a cyclic animation sequence under constraints that include using a predefined cyclic time period. Indeed, the cyclic animation neural network enforces global cyclic behavior by using cyclic positional encoding concatenated with the wind direction. The cyclic animation neural network passes the concatenated features through different fully convolutional layers to extract features of varying dimensions. The resulting features are provided as skip connections to synthesize the sequence of normal maps.

Additionally, one or more implementations of the cyclic animation system re-shades the image based on intrinsic image decomposition. In particular, the cyclic animation system utilizes the original image and the predicted normal map sequence to generate the cinemagraph. Indeed, the cyclic animation system synthesizes the sequence of normal maps using a constrained reshading approach. To implement a constrained reshading approach, the cyclic animation system uses intrinsic image decomposition to decompose the image into a reflectance map and a shading layer. In particular, the shading layer aids in the perception of changes in the fold and wrinkle patterns of the garment is animated. The cyclic animation system synthesizes the shading layer consistent with the animated surface normal map. Furthermore, the cyclic animation system composes the original reflectance map with the synthesized shading layer to generate the intended cinemagraph. Notably, this approach changes only the shading without warping the texture of the garment and is sufficient to provide the perception of a plausible animation.

As discussed above, conventional systems have a number of technical shortcomings with regard to accuracy, efficiency, and flexibility. Conventional systems typically create a cinemagraph from a still image by warping visual features encoded by the neural network and later decoding the warped visual features into their new location. While this technique works for nature scenes such as rivers and waterfalls, warping based solutions are sub-optimal for cinemagraphs such as a human cinemagraph simulating clothing being blown by the wind. A first problem is that warping based solutions assume a constant flow, which does not work well for modeling manipulable objects such as cloth deformations. Additionally, warping solutions displace the appearance of the image to present a sense of motion. In contrast, wrinkles and folds in a manipulable object, to appear realistic, need to be generated and deformed in three dimensions. Direct warping of features typically results in an inaccurate displacement of the appearance of the manipulable object and does not provide an accurate representation of its underlying geometry.

To create non-warping-based solutions, conventional systems typically create looping clips by leveraging videos as input. For example, conventional systems often create cinemagraphs through a painstaking process that requires an artist to obtain content by capturing a suitable input video, typically using a tripod and carefully masking out most of the movements in a post-processing stage. Indeed, a conventional solution to training a neural network to provide a plausible cinemagraph would require collecting a large dataset of hundreds or thousands of videos of people holding perfectly still under the influence of wind from different known directions. Using conventional systems to simulate different wind force and directions using oscillating fans in a lab setup, capturing the variability of garment geometry and appearance types in such a controlled setting is challenging, inefficient, and inflexible.

Furthermore, many conventional systems are computationally expensive to train and implement. For example, obtaining real data for training large-scale models on thousands (or even more) of digital images requires significant computer resources (in processing power and memory). Conventional systems have not identified an approach to address animating a manipulable object within a single image in a controlled loop, in part, because any solution would make the computational burden of implementing models prohibitively expensive.

As suggested above, embodiments of the cyclic animation system provide a variety of benefits over conventional image modification systems. For example, embodiments of the cyclic animation system improve efficiency, flexibly, and computational cost by operating in normal space to learn plausible motion dynamics by training on synthetic data. In short, the cyclic animation system efficiently predicts looped normal maps from an input surface normal map conditioned using synthetic data on a cyclic time interval. By training the model with synthetic data that simulates the dynamics of garments draped around humans under the wind, the cyclic animation system efficiently and flexibly models the plausible motion of manipulable objects in wind. The computational cost of the cyclic animation system is dramatically less than the cost of a conventional system utilizing real data.

Similarly, by re-shading the image using intrinsic image decomposition, the cyclic animation system provides a more realistic, rendition of a manipulable object moving in wind. In particular, by synthesizing a shading map that is consistent with the animated surface normal maps, the perception of movement in the fold and wrinkle patterns of the manipulable object is plausibly conveyed. By using an unmodified reflectance map of the image, the cyclic animation system maintains the albedo invariant color of the manipulable material for the animation. Indeed, in one or more implementations, the cyclic animation system changes the shading without warping the texture of the garment to provide the perception of plausible animation. In contrast to direct warping of features that results in an inaccurate displacement of the appearance of the manipulable object, the cyclic animation system provides an accurate representation of the source image underlying geometry.

Additional detail regarding the interactive image editing system will now be provided with reference to the figures. For example, FIG. 1 illustrates a schematic diagram of an example system environment 100 (or "environment") for implementing a cyclic animation system 106 in accordance with one or more embodiments. An overview of the cyclic animation system 106 is described in relation to FIG. 1. Thereafter, a more detailed description of the components and processes of the cyclic animation system 106 is provided in relation to the subsequent figures.

As shown, the environment 100 includes server device(s) 102, an image repository 114, a client device 110, and a network 108. Each of the components of the environment communicate via the network 108, and the network 108 is any suitable network over which computing devices communicate. Example networks are discussed in more detail below in relation to FIG. 12.

As mentioned, the environment 100 includes a client device 110. The client device 110 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 110, in some embodiments, the environment 100 includes multiple different client devices, each associated with a different user. The client device 110 communicates with the server device(s) 102 via the network 108. For example, the client device 110 provides information to server device(s) 102 indicating client device interactions (e.g., digital image selections, user interactions with one or more pixels of a digital image, or other input) and receives information from the server device(s) 102 such as digital images and/or image manipulation information. Thus, in some cases, the cyclic animation system 106 is implemented via the server device(s) 102 provides and receives information based on client device interaction via the client device 110.

As shown in FIG. 1, the client device 110 includes a digital graphics application 112. In particular, the digital graphics application 112 is a web application, a native application installed on the client device 110 (e.g., a mobile application, a desktop application, etc.), or a cloud-based application where all or part of the functionality is performed by the server device(s) 102. Based on instructions from the digital graphics application 112, the client device 110 presents or displays information to a user, including digital images and/or image manipulation information.

As illustrated in FIG. 1, the environment 100 includes the server device(s) 102. The server device(s) 102 generates, tracks, stores, processes, receives, and transmits electronic data, such as digital images, manipulation information, and/or indications of editorial changes. For example, the server device(s) 102 receives data from the client device 110 in the form of an indication of a client device interaction with a digital image. In response, the server device(s) 102 transmits data to the client device 110 to cause the client device 110 to display or editorial changes for the digital image. The server device(s) 102 can also monitor creation of digital images at the client device 110, receive digital images from the client device 110, and generate/store changes corresponding to the digital images.

In some embodiments, the server device(s) 102 communicates with the client device 110 to transmit and/or receive data via the network 108. In some embodiments, the server device(s) 102 comprises a distributed server where the server device(s) 102 includes a number of server devices distributed across the network 108 and located in different physical locations. The server device(s) 102 can comprise a content server, an application server, a communication server, a web-hosting server, a multidimensional server, or a machine learning server. The server device(s) 102 further access and utilize the image repository 114 to store and retrieve information such digital images and/or image manipulation information.

As further shown in FIG. 1, the server device(s) 102 also includes the cyclic animation system 106 as part of a digital graphics system 104. For example, in one or more implementations, the digital graphics system 104 stores, generates, modifies, edits, enhances, distributes, and/or shares digital content, such as digital images or cinemagraphs. For example, the digital graphics system 104 provides tools for the client device 110, via the digital graphics application 112, to display or manipulate pixels of digital images. In some implementations, the digital graphics system 104 provides tools for refining digital images or displaying digital images.

In one or more embodiments, the server device(s) 102 implements all, or a portion of, the cyclic animation system 106. As illustrated, the cyclic animation system 106 includes a surface normal estimation neural network 118 and a cyclic animation neural network 120. For example, the cinemagraphic application 116 includes a web hosting application that allows the client device 110 to interact with the server device(s) 102. To illustrate, in one or more implementations, the client device 110 accesses a web page supported and/or hosted by the server device(s) 102.

In certain cases, the client device 110 includes all or part of the cyclic animation system 106. Indeed, as illustrated, the client device 110 can include a cinemagraphic application 116 with the same or similar functionality to the cyclic animation system 106. For example, the client device 110 generates, obtain (e.g., download), or utilize one or more aspects of the cyclic animation system 106, such as the surface normal estimation neural network 118 and the cyclic animation neural network 120 from the server device(s) 102.

For example, in some embodiments, the cyclic animation system 106 trains the surface normal estimation neural network 118 and the cyclic animation neural network 120 via the server device(s) 102. The server device(s) 102 provides the surface normal estimation neural network 118 and the cyclic animation neural network 120 to the client device 110 to generate a time dependent sequence of surface normal maps. In other embodiments, the server device(s) 102 both train and implement the cyclic animation neural network 120. For example, the server device(s) 102 receives a digital image from the client device 110, generates a surface normal map from the digital image, generates a time dependent sequence of surface normal maps, generates a cinemagraph from the time dependent sequence of surface normal maps, and provides the cinemagraph to the client device 110.

Although FIG. 1 illustrates a particular arrangement of the environment, in some embodiments, the environment has a different arrangement of components and/or may have a different number or set of components altogether. For instance, as mentioned, the cyclic animation system 106 is implemented by (e.g., located entirely or in part on) the client device 110. In addition, in one or more embodiments, the client device 110 communicates directly with the cyclic animation system 106, bypassing the network 108.

As mentioned, in one or more embodiments, the cyclic animation system 106 works in the normal space to learn plausible motion dynamics of manipulable objects and generate a cinemagraph. A cinemagraph is a type of animated image that combines elements of still photography and video. A cinemagraph consists of a photograph or series of photographs that have been edited to create a looping animation of a specific portion of the image. The rest of the image remains static, creating the illusion of a still photograph that has a small, moving element therein. Cinemagraphs, thus, highlight a specific element of an image or to create an intriguing or surreal effect.

Figure 2:
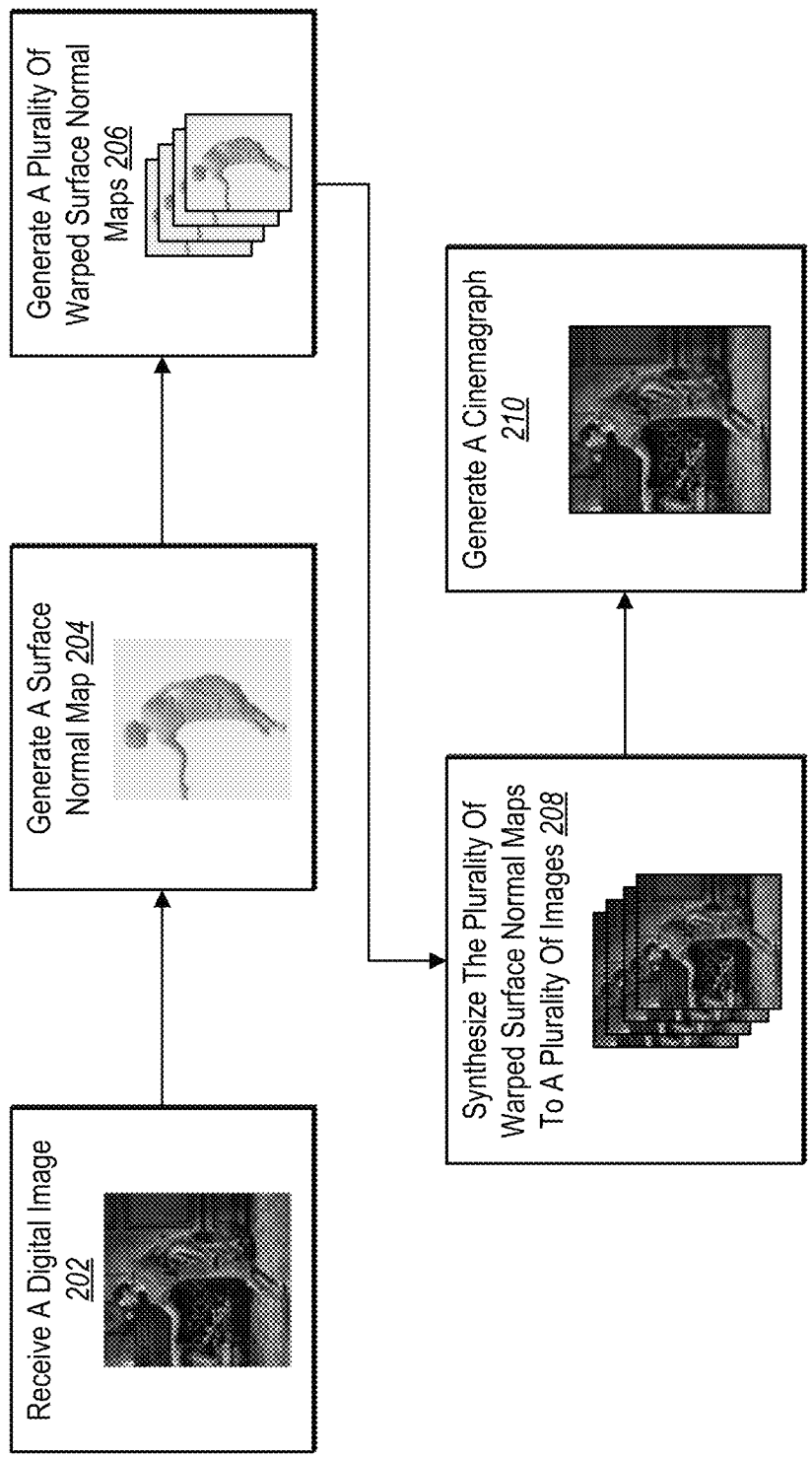
FIG. 2 illustrates an overview of generating a cinemagraph from an image in accordance with one or more embodiments.

FIG. 2 illustrates an overview of the process of creating a cinemagraph utilizing the cyclic animation system 106 in accordance with one or more embodiments. For example, FIG. 2 illustrates the cyclic animation system 106 receiving or identifying a digital image 202. Specifically, the digital image 202 is a single digital image comprising a stationary object such as a person and a manipulable object such as a garment. The digital image 202 comprises an RGB image or other applicable image type (e.g., CMYK, LAB, HSL, greyscale). In particular, the digital image 202, in one or more implementations, is represented as an RGB image I where $I \in \mathbb{R}^{W \times H \times 3}$. A manipulable object is an object that is moveable under the influence of wind as influenced by the material and properties of the object itself. Different types of manipulable objects will move in different ways based on their specific characteristics. For example, a lightweight, thin, and smooth fabric such as silk will tend to move more freely and fluidly in the wind. Silk will flow and billow and have a low resistance to movement. On the other hand, a heavier, thicker, and more textured fabric, such as wool or canvas, will tend to move less freely and more stiffly in the wind. Heavier fabrics may not flow or billow as easily and may have more resistance to movement than lighter fabrics. Overall, the movement of manipulable object in the wind is a result of the forces of the wind acting on the material, as well as the properties of the object itself. In contrast, a stationary object is an object that is resistant to movement under the influence of wind. For example, a person or other stationary object is generally resistant to the influence of light wind.

The cyclic animation system 106 generates a surface normal map 204 from the digital image 202. Specifically, the cyclic animation system 106 predicts the surface normal map using a surface normal estimation neural network 118. Surface normal maps (or "normal maps") represent the geometry of the objects in a given image, where colors encode the direction of the normal vectors. As wind force is applied to a manipulable object, new wrinkles and folds appear that change the 3D geometry of the manipulable object. Surface normal maps provide, in one or more implementations, a more explicit representation of the image geometry. Therefore, capturing the animation in the normal space helps to generate geometrically plausible manipulable object deformations. Additionally, the normal map decomposition helps to train the cyclic animation system 106 more efficiently. Manipulable object comprises a wide range of textures, colors, and materials. Normal maps are invariant to appearance (cloth, color, texture, illumination, etc.) and hence the gap between synthetic and real data in the normal map space is smaller. A normal map estimator, such as include a photometric stereo estimator, a depth map estimator, a surface fitting or surface normal estimation neural network, predicts a surface normal map of a digital image. In one or more embodiments, the cyclic animation system 106 utilizes a surface normal estimation neural network as described by Bansal et al., in *Marr Revisited: 2D-3D Alignment via Surface Normal Prediction*, Proceedings of the IEEE Conference on Computer Vision and Pattern Recognition (CVPR), 2016, pp. 5965-5974, the contents of which are incorporated by reference herein in their entirety, or a surface normal estimation neural network as described by Bae et al., in *Estimating and Exploiting the Aleatoric Uncertainty in Surface Normal Estimation*, International Conference on Computer Vision (ICCV), 2021, the contents of which are incorporated by reference herein in their entirety.

The cyclic animation system 106 utilizes the cyclic animation neural network 120 to generate a plurality of warped surface maps from the surface normal map 204. Specifically, FIG. 2 illustrates the cyclic animation system 106 generates a plurality of warped surface normal maps 206 with plausible movement dynamics for the manipulable objects in the normal maps. A warped surface normal map is a surface normal map that has been altered or adjusted in some way by the cyclic animation system 106. This is done to achieve a specific effect, namely, to model the interaction of wind with the manipulable objects in the surface normal map.

Cinemagraphs are, by definition, looped clips. To achieve this behavior, the cyclic animation system 106 is trained to create the warped surface normal maps with cyclic behavior with respect to a time parameter. Then, given a chosen cycle length of T, the cyclic animation system generates the same output for t=0, t=T, t=2T and so forth. Indeed, the cyclic animation system 106 generates the plurality of warped surface maps in a cyclic animation sequence, $V:=\{I_0, I_1, \ldots, I_t | I_0=I_t\}$, based upon both time and wind and modeled by $F(I,w) \rightarrow V^w$ as discussed below in reference to subsequent figures.

The cyclic animation system 106 synthesizes the plurality of warped surface normal maps into a plurality of images 208. In one or more implementations the cyclic animation system 106 utilizes a constrained reshading approach based on intrinsic image decomposition to decompose the image into a reflectance map and a shading map. The cyclic animation system 106 modifies the shading layer consistently with each of the frames of the plurality of warped surface normal maps to change the pixel intensities of the digital image 202 and generate the plurality of images. Images processed by the cyclic animation system 106, in one or more implementations, have a more vivid look, making them more appealing and engaging as further discussed below in reference to subsequent figures.

The cyclic animation system 106 generates a cinemagraph 210 from the plurality of images. In particular, the generated cinemagraph provides a cyclic video clip in which a minor and repeated movement occurs in the manipulable object(s) displayed in the digital image 202. As an example, the cyclic animation system 106 animates the clothes draped on a human body, as if waved by the wind, while keeping the rest of the image still.

Figure 3:
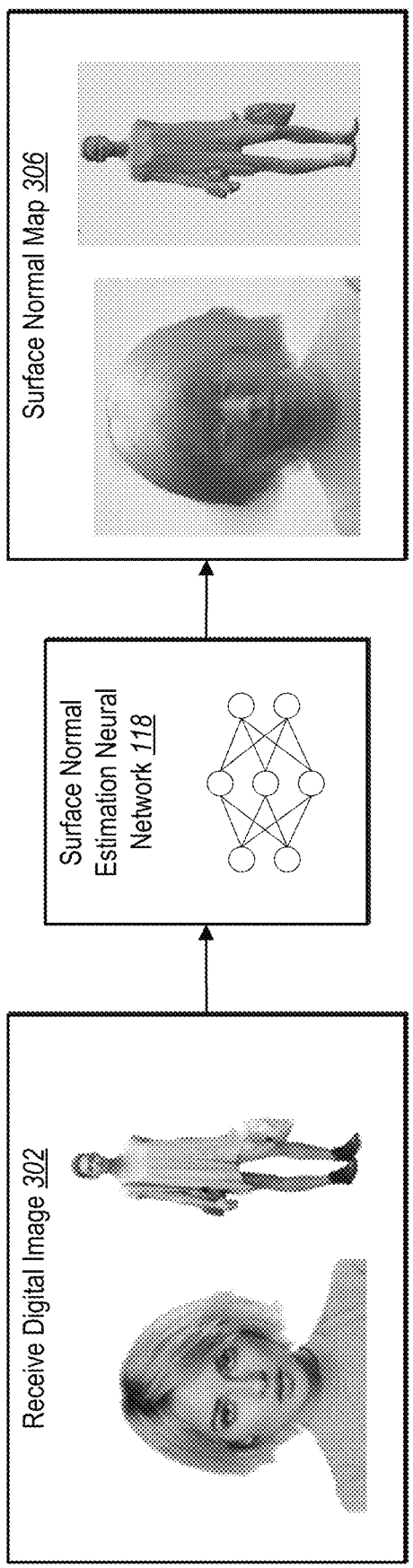
FIG. 3 illustrates an example utilizing a neural network to provide a normal map estimation of an image in accordance with one or more embodiments.

As mentioned, in one or more embodiments, the cyclic animation system 106 utilizes a machine learning model to generate a normal map estimation of a digital image. For example, FIG. 3 illustrates an overview of generating a surface normal map utilizing a surface normal estimation neural network 118. In one or more embodiments, a machine learning model includes a computer representation that is tunable (e.g., trained) based on inputs to approximate unknown functions used for generating the corresponding outputs. In some embodiments, a machine learning model includes a computer-implemented model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

For example, FIG. 3 illustrates that the cyclic animation system 106 utilizes a surface normal estimation neural network 118 to generate a surface normal map. Specifically, the cyclic animation system 106 receives a digital image 302 from which to generate a cinemagraph. The surface normal estimation neural network 118 then generates a surface normal map 206 from the digital image 302. As mentioned above, the surface normal estimation neural network includes a photometric stereo estimator, a depth map estimator, a surface fitting estimator, or any applicable estimator used to predict the surface normal map.

Figure 4:
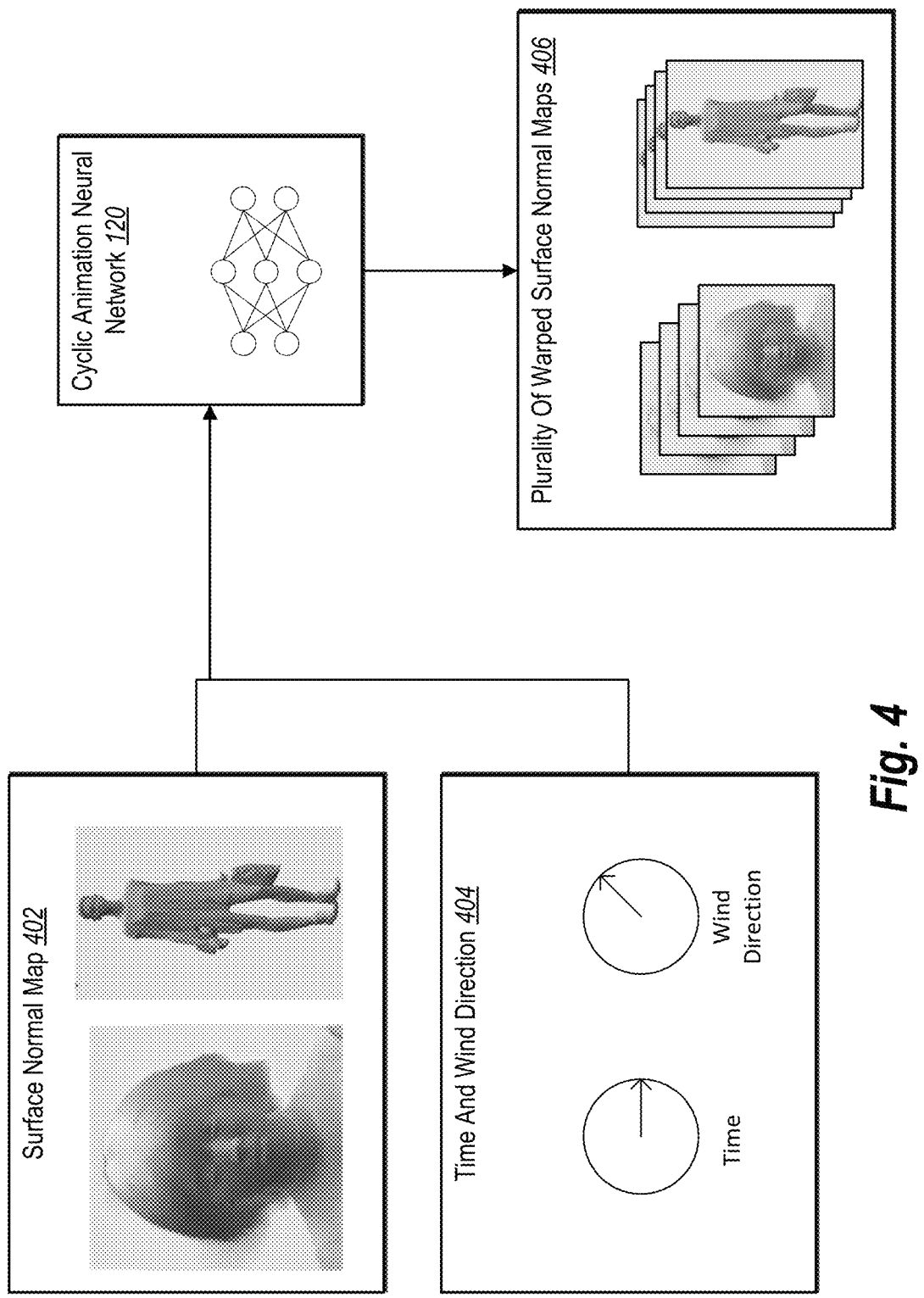
FIG. 4 illustrates a cyclic animation neural network, given a normal map, time period, and wind direction, generating a plurality of warped surface normal maps in accordance with one or more embodiments.

FIG. 4 provides additional detail regarding the cyclic animation neural network 120. As shown in FIG. 4, the cyclic animation neural network 120 receives a surface normal map 402 from the surface normal estimation neural network 118. Furthermore, given the surface normal map 402, the cyclic animation system 106 utilizes the cyclic animation neural network 120 conditions the surface normal map based on time and wind direction 404. Specifically, the cyclic animation neural network 120 conditions the surface normal map given an input normal map N and a wind direction w. In particular, the cyclic animation neural network 120 learns the mapping $F_N$ (N, w)$\rightarrow V_N^w = \{N_0, N_1, \ldots, N_T | N_0 = N_T\}$, where $V_N^w$ demonstrates a mapping with plausible animation of manipulable objects within the image. The cyclic animation neural network 120 is conditioned for a cyclic animation sequence with a predefined period of T, and satisfies the constraints $N_t = N_{t+kT} \forall k \in Z$. Furthermore, the cyclic animation neural network 120 utilizes this mapping to generate a plurality of warped surface normal maps 406. In particular, the cyclic animation neural network 120 generates a plurality of warped surface normal maps given an input normal map N, a time period of T, and a wind direction w.

Cinemagraphs are, by definition, closed loop clips. The cyclic animation neural network 120 synthesizes a time dependent sequence that is a closed loop clip by decoding the extracted features of time and wind direction. A time dependent sequence is a series of events or actions that are arranged in a specific order and are intended to occur at specific times or intervals. The sequence may be controlled by a timing mechanism or may repeat in a regular pattern, with each cycle lasting a certain period of time and consisting of a specific set of actions.

To achieve this behavior, the cyclic animation neural network 120 is trained with cyclic behavior with respect to the time parameter T. Then, given a chosen cycle length of T, the cyclic animation neural network 120 generates the same output for t=0, t=T, t=2T and so forth. Indeed, the cyclic animation neural network 120 decodes extracted features based on time $\Delta t$ and direction w. The cyclic animation neural network 120 generates a time dependent sequence 414 utilizing a predefined period of T. This amounts to synthesizing normal maps that satisfy constraints $N_t = N_{t+kT} \forall k \in Z$. The cyclic animation neural network 120 uses image-to-image translation to learn f ($N_t$, $\Delta t$, w)$\longrightarrow N_{t+\Delta t}$ where $\Delta t \in [-T/2, T/2]$. Note that, since the cyclic animation neural network 120 is generating looped animations, negative values for $\Delta t$ correspond to valid animation samples.

As mentioned above, the cyclic animation neural network 120 generates cyclic surface maps based on both the time $\Delta t$ and the wind direction w. Indeed, in one or more implementations, the wind direction is a user controllable parameter. Hence, a user can define a wind direction, and even change the wind direction in real time. This will cause the cyclic animation neural network 120 to generate motions consistent with the desired/input wind direction.

Figure 5:
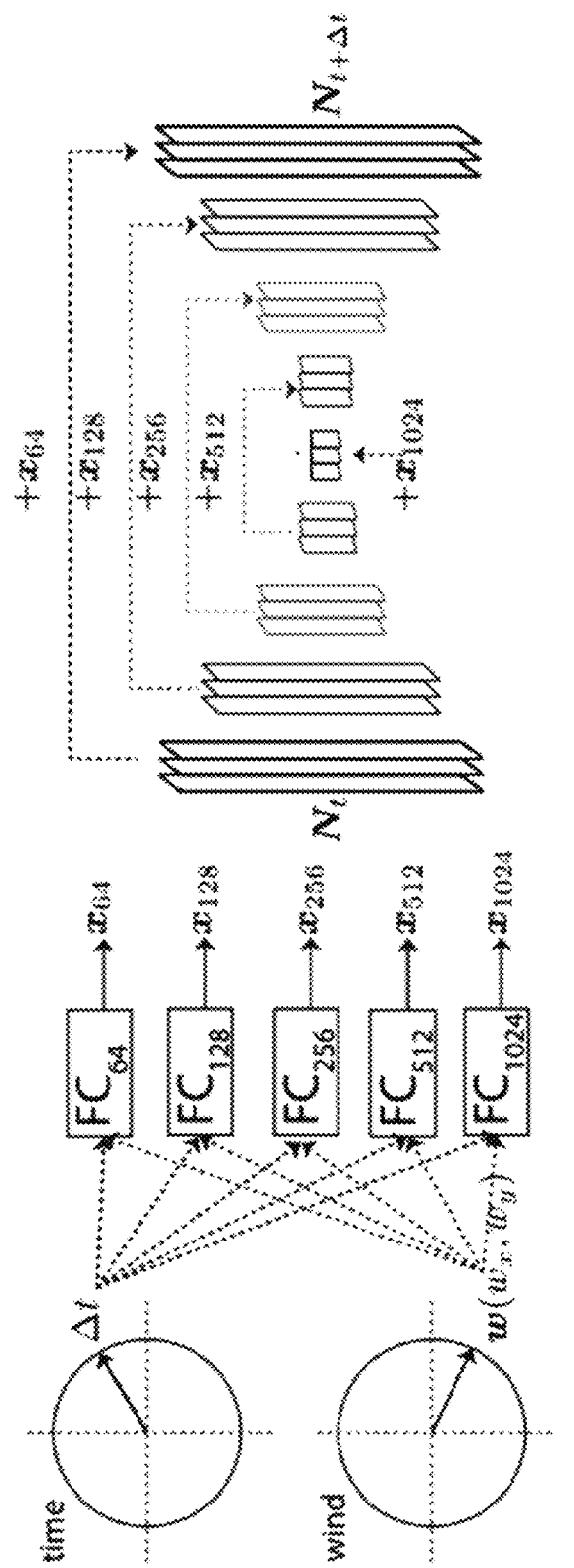
FIG. 5 illustrates an example architecture of a cyclic animation neural network in accordance with one or more embodiments.

The cyclic animation neural network 120, in one or more implementations, comprises a modified UNet architecture that is conditioned on both the residual time $\Delta t$ and the wind direction w, as shown in FIG. 5. To enforce a cyclic behavior, the cyclic animation neural network 120 encodes $\Delta t$ using sinusoidal functions as:

$$\varphi_{\Delta t} = \frac{2\pi n}{T} \Delta t, n = 1, 2, 3, 4, 5$$

$$x_{\Delta t} = \{\cos(\varphi_{\Delta t}), \sin(\varphi_{\Delta t})\}.$$

This formulation ensures that f ($N_t$, $\Delta t + kT$, w) with $k \in Z$ gives the same output resulting in a cyclic animation sequence. Specifically, the cyclic animation neural network 120 generates the time encodings utilizing sinusoidal functions to generate time encodings of multiple circumferences parameterized by a change in time. Indeed, the time encoding $x_{\Delta t}$ comprises multiple circumferences parameterized by $\Delta t$. Following a similar fashion, the cyclic animation neural network 120 is also conditioned to the wind direction, represented as a unit length vector. Indeed, this allows the cyclic animation neural network 120 to control the wind direction for a time T. Using multiples of the data frequency ($\omega = 2\pi n/T$) helps the cyclic animation neural network 120 to learn higher frequency motions while still enforcing a global cyclic behavior with period T. The cyclic animation neural network 120 represents the wind direction as a unit vector w in the image plane. The cyclic animation neural network 120 concatenates w with $x_{\Delta t}$ resulting in the conditioning code $x := x_{\Delta t} || w = (x_{\Delta t, 0}, x_{\Delta t, 1}, \ldots, x_{\Delta t, 2n}, w_x, w_y)$. The cyclic animation neural network 120 conditions the UNet by introducing x at each feature map extracted by the encoder at different scales. To do so, the cyclic animation neural network 120 first linearly transforms x to the corresponding feature map dimensionality with learnable weights $\{W_i \in R^{F_i \times D}\}$, where $F_i$ is the number of channels of the i-th feature map and D is the dimensionality of x. The cyclic animation neural network 120 applies 1×1 convolutions to the feature maps before and after combining them with x. Indeed, the cyclic animation system 106 decodes the extracted features together with the time encodings and the one or more wind direction encodings at different scales and passing the combinations to the decoder via skip links.

Specifically, as shown by FIG. 5, the cyclic animation neural network 120 extracts features from a digital image (e.g., normal map $N_t$) depicting one or more manipulable objects utilizing an encoder of the cyclic animation neural network. The cyclic animation neural network 120 then decodes the extracted features together with the time encodings and the one or more wind direction encodings utilizing a decoder of the cyclic animation neural network to generate a plurality of images with the one or more manipulable objects warped in a time dependent sequence based on the wind direction. Indeed, the cyclic animation neural network 120 generates a plurality of warped surface normal images. The cyclic animation neural network combines the extracted features together with the time encodings and the one or more wind direction encodings at different scales and passing the combinations to the decoder via skip links, which are then decoded.

In one or more embodiments, when training the cyclic animation neural network 120, the cyclic animation system 106 simulates each sample for 250 frames at 30 fps. In training, the garment drapes on the body in roughly the first 50 frames of the sequence and later starts blowing in the wind. The cyclic animation neural network 120 processes the resulting animations to detect plausible loops in the animations. After this step, the cyclic animation neural network 120 obtains animation sequences of length 150 frames which the cyclic animation neural network 120 uses as the duration of loops, i.e., T=150.

As mentioned above, in one or more embodiments, the cyclic animation system 106 trains the cyclic animation neural network 120 with synthetic data. In some cases, the cyclic animation system 106 trains the cyclic animation neural network 606 (e.g., cyclic animation neural network 120) have internal parameters such as weight and biases for generating a predicted output 608 (e.g., a predicted surface normal map) based on training data.

As shown, the cyclic animation system 106 accesses sample data 602 from a database 604 (e.g., image repository 114). For example, the cyclic animation system 106 determines sample data 602 such as sample digital images to input into the cyclic animation neural network 606. In one or more implementation, the cyclic animation system 106 generates a synthetic dataset that consists of different type of garments draped on human bodies with varying shape and pose. Specifically, the cyclic animation system 106 samples human body and garment pairs from a large-scale dataset of clothed 3D humans. The cyclic animation system 106 selects a number (e.g., 1500) of samples with skirt and dresses and a number of samples (e.g., 500) with other clothing types (e.g., trousers, t-shirts). The cyclic animation system 106 treats each sample in the dataset is treated as a motion sequence. The cyclic animation system 106 randomly choose one of the frames in each sequence as a random human body pose. For the chosen frame, body and outfit, defines the initial conditions. To this end, the cyclic animation system 106 choose a random wind direction in the image plane with constant wind force and simulate the cloth dynamics while the underlying body remains still. Each simulation output is rendered from a fixed viewpoint with a predefined lighting setup. The cyclic animation system 106 applies random checkerboard texture patterns to some garments and assign uniform color material to others. In addition to RGB output, the cyclic animation system 106 also renders the corresponding surface normal maps and segmentation masks (body, cloth and background).

In some embodiments, the cyclic animation system 106 utilizes the cyclic animation neural network 606 to generate a predicted output 608 from the sample data 602. Specifically, the cyclic animation neural network 606 generates a predicted output 608 according to its internal parameters. As part of training the cyclic animation neural network 606, the cyclic animation system 106 performs a comparison 610. Specifically, the server device(s) 102 compares the predicted output 608 with a ground truth output 612 (e.g., a ground truth surface normal map). Indeed, the server device(s) 102 accesses the ground truth output 612 from the database 604, where the ground truth output 612 is designated as corresponding to the sample data 602. In some cases, the server device(s) 102 performs the comparison 610 using a loss function such as a mean squared error loss function or a cross entropy loss function to determine an error, or a measure of loss associated with the cyclic animation neural network 606 (or between the predicted output 608 and the ground truth output 612).

Figure 6:
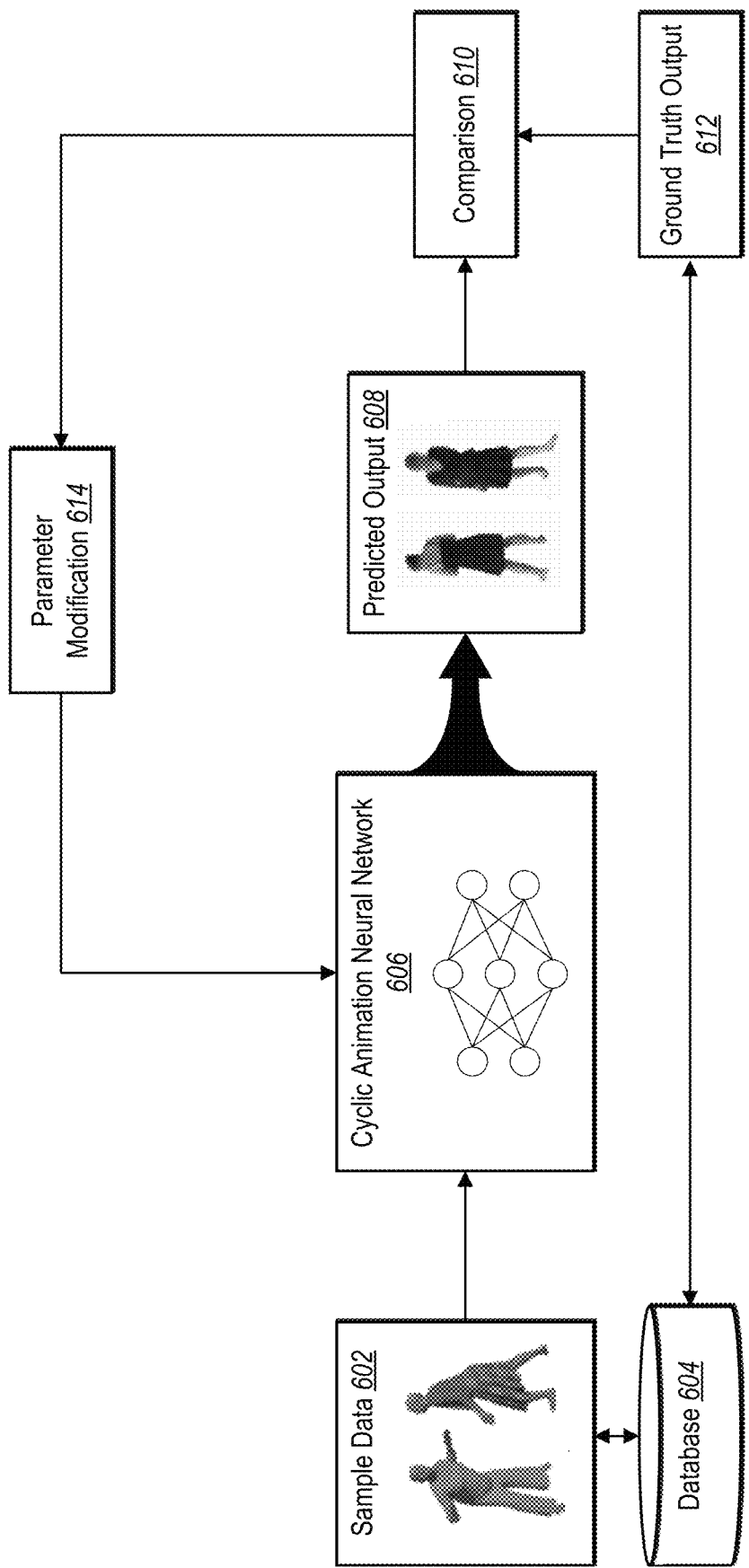
FIG. 6 illustrates an overview of learning parameters for a cyclic animation neural network in accordance with one or more embodiments.

In one or more embodiments, the server device(s) 102 further performs a parameter modification 614. Based on the comparison 610, the server device(s) 102 modifies parameters of the cyclic animation neural network 606. For example, the server device(s) 102 modifies parameters of the cyclic animation neural network 606 to reduce a measure of error or a loss associated with the cyclic animation neural network 606. The server device(s) 102 can further repeat the process illustrated in FIG. 6 for many iterations or epochs until the cyclic animation neural network 606 satisfies a threshold measure of loss. For each iteration, the server device(s) 102 generates new predictions from new sample data, performs a comparison, and modifies parameters (e.g., via back propagation) to improve predictions for subsequent iterations.

Although, in the RGB space there is often a big gap between synthetic and real data distribution making generalization hard, normal maps are invariant to appearance (cloth color, texture, illumination, etc.) and hence the gap between synthetic and real data in the normal map space is smaller. By utilizing a reshading approach that synthesizes RGB pixels from the original image and animated normals, the cyclic animation system 106 overcomes this gap. Hence, the cyclic animation system 106 can be applied to real images for plausible results.

In addition to synthetic data, the cyclic animation neural network 120 utilizes sample images to test generalization. To evaluate if the predictions generated by cyclic animation neural network 120 contain plausible cloth dynamics, the cyclic animation system 106 predictions generated from synthetic data are compared to a small set of real examples. Specifically, a short video sequence obtained from a human subject wearing different types of garments holding a still pose next to an oscillating fan while being recorded by a fixed camera mounted on a tripod is obtained. Indeed, 50 such videos demonstrating 8 different outfit types is collected. Similar to synthetic data, the cyclic animation neural network 120 processes the data to obtain looped animations. The predictions generated from real samples are compared to the predictions generated from the synthetic data.

Figure 7:
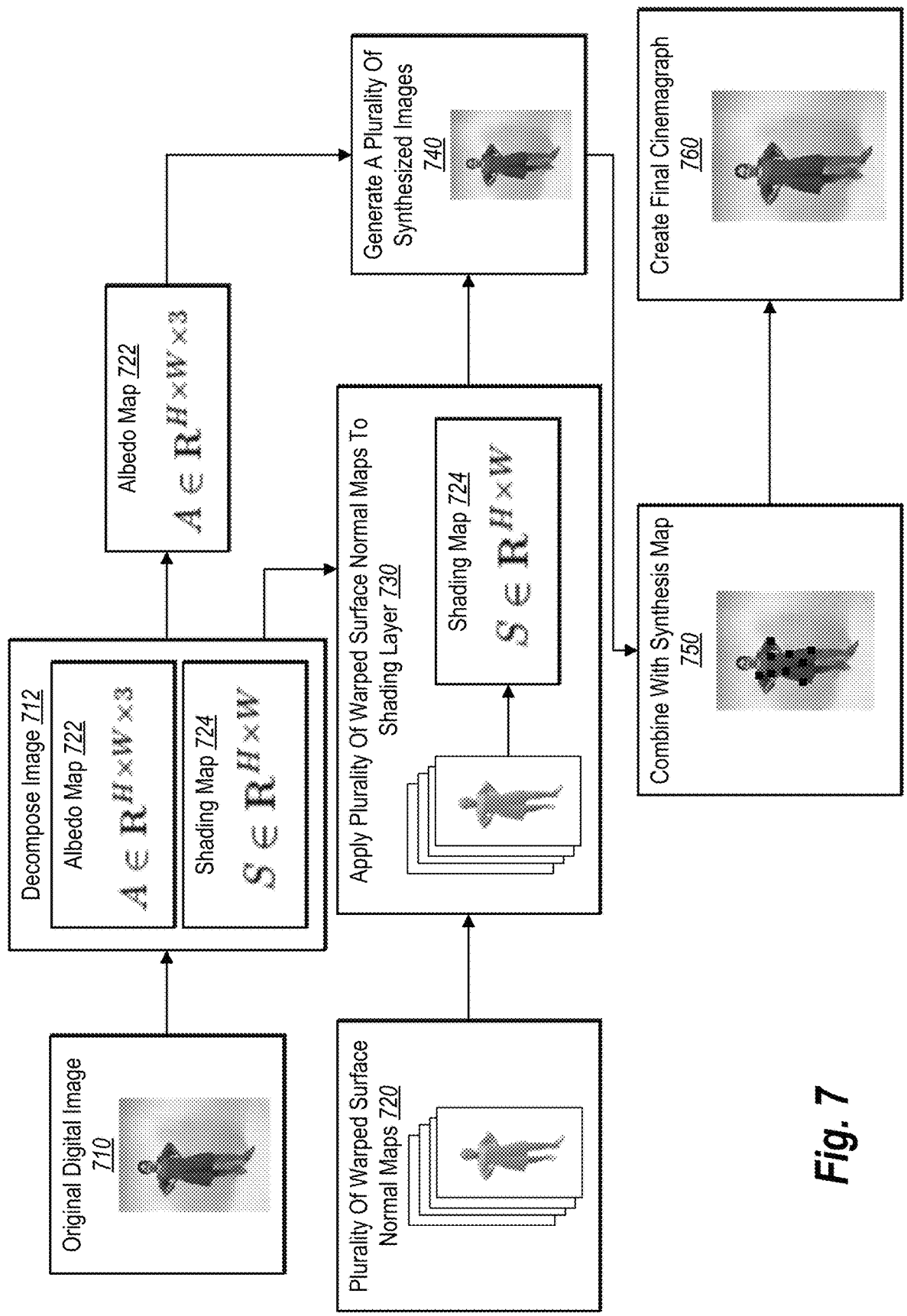
FIG. 7 illustrates an overview of using intrinsic image decomposition to generate a cinemagraph in accordance with one or more embodiments.

As mentioned, in one or more embodiments, the cyclic animation system 106 computes the cinemagraph using intrinsic image decomposition. FIG. 7 illustrates an overview of using intrinsic image decomposition to generate the cinemagraph. As shown in FIG. 7, the cyclic animation system 106 computes the cinemagraph given the original digital image and the plurality of warped surface normal maps. Specifically, given the digital image 710, the cyclic animation system 106 decomposes the digital image to obtain the reflectance map 722 ("A") and the shading map 724 ("S"). To this end, the cyclic animation system 106 utilizes intrinsic image decomposition to decompose the digital image 710 into two maps, denoted by I=SA. Indeed, the reflectance map 722 is specified by $A \in R^{W \times H \times 3}$ which denotes the albedo invariant color of the materials. The shading map 724 is specified by $S \in R^{W \times H}$ which is the result of the interaction of the light with the underlying geometry of the garment. Assuming a simple lighting model composed of a directional and ambient light, the cyclic animation system 106 optimizes for the light parameters using the predicted surface normal map from the input image:

$$S = \max(0, -Nl) + \delta$$

where $l \in R^3$ is the light direction and $\delta \in R^+$ is the ambient light.

Given this, the cyclic animation system 106 applies the plurality of warped surface normal maps 720 to the shading layer and synthesize a plurality of new shading layers 730. Specifically, the cyclic animation system 106 generates a plurality of new shading layers that are consistent with the plurality of surface normal maps generated by the cyclic animation neural network 120. Given the plurality of warped surface normal maps $\hat{V}_N$, the cyclic animation system 106 generates a new shading map sequence. Notably, the interaction between objects and illumination depends on the 3D geometry of the scene as represented by the plurality of warped surface normal maps obtained as outlined in FIG. 4. Indeed, the cyclic animation system 106 generates a plurality of warped surface normal maps have geometrically consistent new wrinkles and folds. In particular, the warped surface normal maps are free of distortions or anomalies that would break the rules of geometry, such as objects appearing to be stretched or distorted, or features appearing to be out of proportion or out of alignment. Thereafter, the cyclic animation system 106 modifies the shading layer consistently with each of the frames of the plurality of warped surface normal maps generated by the cyclic animation neural network 120.

As further shown in FIG. 7, the cyclic animation system 106 composes the plurality of new shading layers with the reflectance map 722 to generate a plurality of synthesized images 740. In particular, the cyclic animation system 106 composites the plurality of new shading layers with the original reflectance map R to obtain a plurality of synthesized images. In some embodiments, at inference time, the user provides a cinemagraphic mask to denote the region of interest where the motion will be synthesized. Thereafter, the cyclic animation system 106 combines the plurality of synthesized images based on the cinemagraphic mask to provide the output 750. While this approach changes only the shading without actually warping the texture of the garment, it is sufficient to provide the perception of a plausible animation. Thereafter, the cyclic animation system 106 generates a cinemagraph 760 from the cyclic animation sequence $\hat{V}$.

In an alternative embodiment, the cyclic animation system 106 utilizes a reshading method with the rendering functions:

$$I = R \circ S(N, L)$$

$$S(N, L) = \sum_i \max(0, -N \cdot L_i) + \delta$$

where the albedo estimation is represented by:

$$R_0 \approx \frac{I_0}{S(N_0, L)}$$

and the reshading is performed by:

$$I_t = \frac{I_0}{S(N_0, L)} \circ S(N_t, L)$$

Note how:

$$\Delta_t I = R \circ \Delta_t S(N, L)$$

Then:

$$\Delta_t N = 0 \to \Delta_t S = 0 \leftrightarrow \Delta_t I = 0$$

In an alternative embodiment, the cyclic animation system 106 utilizes a reshading method given a normal estimator f like:

$$\hat{N}_t = f(I_t)$$

and optimizing an RGB image for time as:

$$I_t = \underset{I}{\mathrm{argmin}}(N_t - f(I)) \mid \Delta_t N_{ij} = 0 \to \Delta_t I_{ij} = 0$$

using a rendering function:

$$I_0 = R \circ S_0$$

with new frames:

$$I_t = R \circ (S_0 + \Delta_t S)$$

per pixel:

$$I_{t,ij} = R_{ij}(S_{0,ij} + \Delta_t S_{ij}) = R_{ij}(kS_{0,ij}) = k_{ij} R_{ij} S_{0,ij} = k_{ij} I_{0,ij}$$

the per-pixel approach is still too flexible:

$$I_{t,ij} = k_{ij} I_{0,ij}$$

assuming shading like:

$$S(N; l) = \max(0, N \cdot l) + \delta$$

then:

$$|\Delta S| \leq |\Delta N \cdot l| \leq |\Delta N|$$

Figure 9:
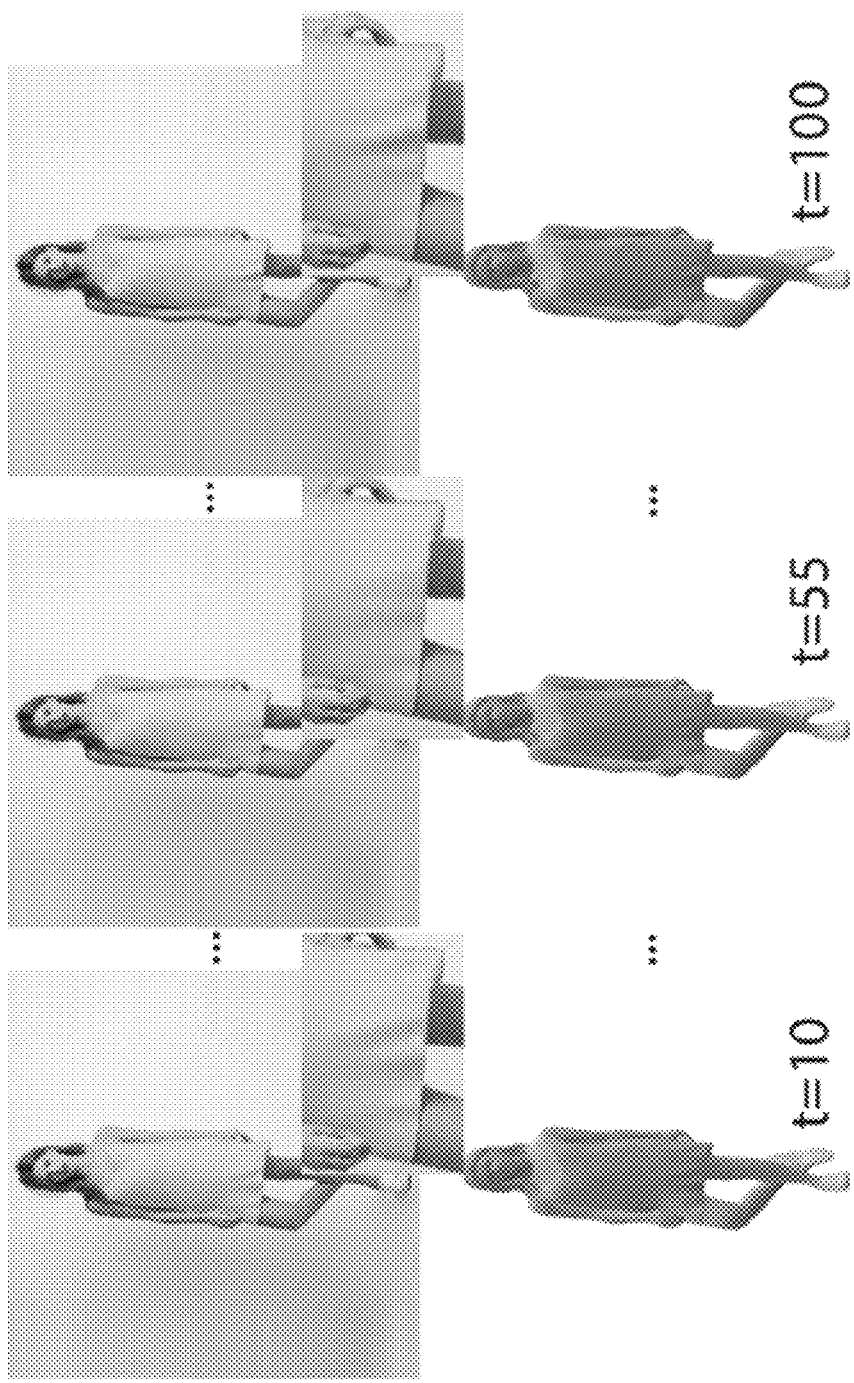
FIG. 9 illustrates of visual representations of image manipulations generated by the cyclic animation system in accordance with one or more embodiments.

FIGS. 8A-8B and FIG. 9 show the accuracy and plausibility of visual representations of image manipulations generated by the cyclic animation system 106 trained on normal maps. FIG. 8A shows frames sampled uniformly every 25 frames from a generated cinemagraph. As shown through the close-up look of the wrinkles, the cyclic animation system 106 generates visually appealing results with plausible wrinkles. FIG. 8B shows the generalization capacity of the cyclic animation system 106 on an image of a hanging garment. As shown, the cyclic animation system 106 generates plausible movement in the wind for a garment hanging on a clothesline, and not only for garments draped on human bodies. FIG. 9 shows a looped animation encoded with a predefined loop duration of 150 frames. As shown, the surface normals show the effect of the garment blowing in the wind. Furthermore, the synthesized corresponding RGB images demonstrate plausible garment deformation. In particular, FIG. 9 shows that the cyclic animation system 106 generates geometrically consistent new wrinkles and folds in the one or more manipulable objects.

Figure 10:
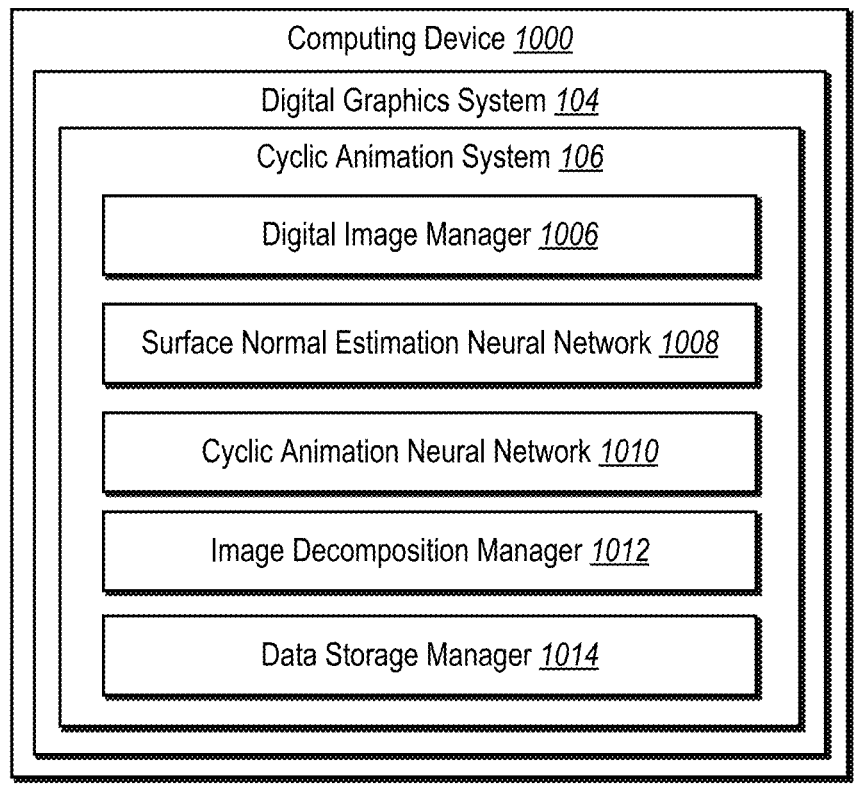
FIG. 10 illustrates an example architecture of a cyclic animation system in accordance with one or more embodiments.

Turning now to FIG. 10, additional detail will be provided regarding components and capabilities of one or more embodiments of the cyclic animation system 106. In particular, FIG. 10 illustrates an example cyclic animation system 106 executed by a computing device 1000 (e.g., the server device(s) 102 of the client device 110). As shown by the embodiment of FIG. 10, the computing device 1000 includes or hosts a digital graphics system 104 and the cyclic animation system 106. Furthermore, as shown in FIG. 10, the cyclic animation system 106 includes a digital image manager 1006, a surface normal estimation neural network 1008, a cyclic animation neural network 1010, an image decomposition manager 1012, and a data storage manager 1014.

As just mentioned, and as illustrated in the embodiment of FIG. 10, the cyclic animation system 106 includes the digital image manager 1006. For instance, the digital image manager 1006 identifies, stores, transmits, and/or displays digital images (and/or digital videos) as described above (e.g., in relation to FIGS. 1, 2, and 7). In some instances, the storage device 1206 stores and maps generated cinemagraphs as described above (e.g., in relation to FIGS. 1-9).

Furthermore, as shown in FIG. 10, the cyclic animation system 106 includes the surface normal estimation neural network 1008. For instance, the surface normal estimation neural network 1008 estimates and generates surface normal maps of digital images as described above (e.g., in relation to FIGS. 1-3). Moreover, in one or more embodiments, the surface normal estimation neural network 1008 utilizes an encoder to predict surface normal maps for target digital images as described above (e.g., in relation to FIGS. 1-3).

As also shown in FIG. 10, the cyclic animation system 106 includes the cyclic animation neural network 1010. For instance, the cyclic animation neural network 1010 produces cyclic surface normal maps from an input surface normal map as described above (e.g., in relation to FIGS. 1, 4A-4D). Additionally, the cyclic animation neural network 1010 produces surface normal maps that add minor and repeated changes to an input surface normal map based on both time and wind variables as described above (e.g., in relation to FIGS. 1, 4A-4D). Moreover, in one or more embodiments, the cyclic animation neural network 1010 learns garment motion dynamics on synthetic data and generalizes to real data as described above (e.g., in relation to FIGS. 1, 5).

Furthermore, as shown in FIG. 10, the cyclic animation system 106 includes the image decomposition manager 1012. For instance, the image decomposition manager 1012 utilizes intrinsic image decomposition to synthesize a new shading layer that is consistent with the plurality of warped surface normal maps as described above (e.g., in relation to FIG. 7).

In addition, as shown in FIG. 10, the cyclic animation system 106 includes the data storage manager 1014. In some embodiments, the data storage manager 1014 is implemented by one or more memory devices. Additionally, in certain instances, the data storage manager 1014 maintains data to perform one or more functions of the cyclic animation system 106. For example, the data storage manager 1014 includes digital images, cinemagraphs, training data, and/or generative neural network components (e.g., neural network parameters, neural network channel weights, GAN data, GAN parameters).

Each of the components 1006-1014 of the cyclic animation system 106 can include software, hardware, or both. For example, the components 1006-1014 can include one or more instructions stored on a computer-readable storage medium and executable by processors of one or more computing devices, such as a client device or server device. When executed by the one or more processors, the computer-executable instructions of the cyclic animation system 106 can cause the computing device 1000 to perform the methods described herein. Alternatively, the components 1006-1414 can include hardware, such as a special-purpose processing device to perform a certain function or group of functions. Alternatively, the components 1006-1014 of the cyclic animation system 106 can include a combination of computer-executable instructions and hardware.

Furthermore, the components 1006-1014 of the cyclic animation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1006-1014 may be implemented as a stand-alone application, such as a desktop or mobile application. Furthermore, the components 1006-1014 may be implemented as one or more web-based applications hosted on a remote server. The components 1006-1014 may also be implemented in a suite of mobile device applications or "apps." To illustrate, the components 1006-1014 may be implemented in an application, including but not limited to, ADOBE PHOTOSHOP, ADOBE PREMIERE, ADOBE LIGHTROOM, ADOBE ILLUSTRATORE, ADOBE SUBSTANCE, ADOBE CREATIVE CLOUD, or ADOBE SENSEI. "ADOBE," "ADOBE PHOTOSHOP," "ADOBE PREMIERE," "ADOBE LIGHTROOM," "ADOBE ILLUSTRATORE," "ADOBE SUBSTANCE," "ADOBE CREATIVE CLOUD," and "ADOBE SENSEI" are either registered trademarks or trademarks of Adobe Systems Incorporated in the United States and/or other countries.

Figure 11:
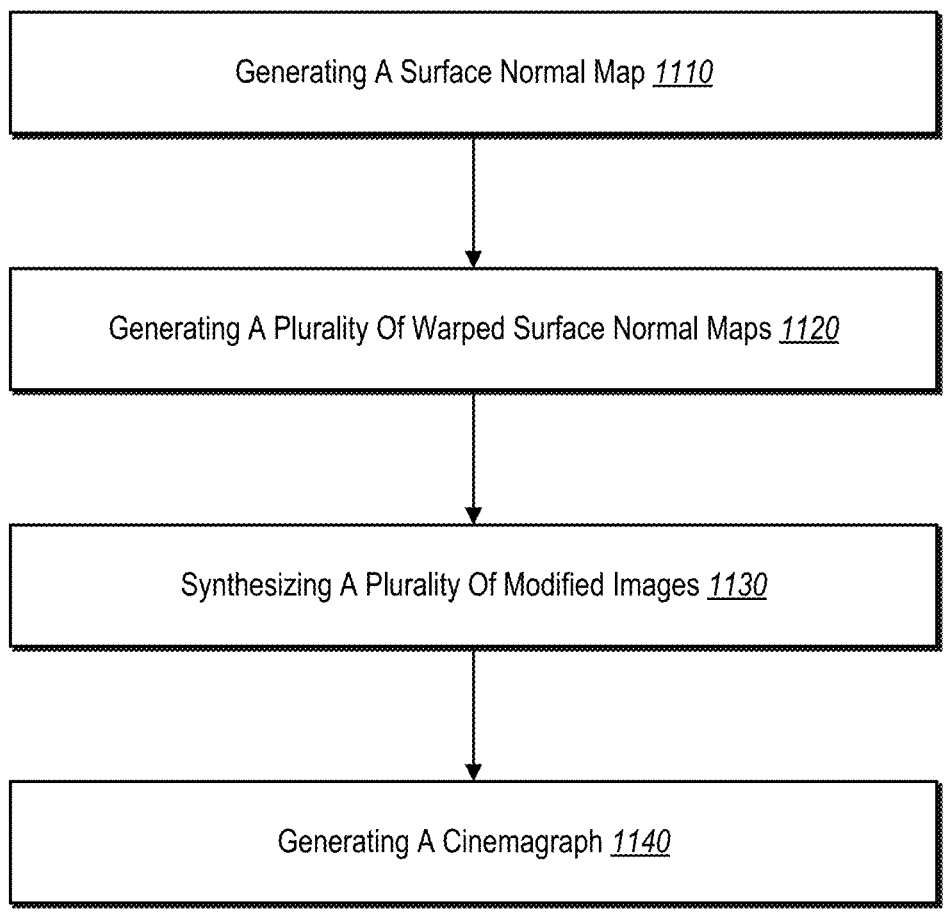
FIG. 11 illustrates a flowchart of a series of acts for utilizing a cyclic animation system to generate a cinemagraph utilizing surface normal maps in accordance with one or more embodiments.

FIGS. 1-10, the corresponding text, and the examples provide a number of different methods, systems, devices, and non-transitory computer-readable media of the cyclic animation system 106. In addition to the foregoing, one or more embodiments can also be described in terms of flowcharts comprising acts for accomplishing a particular result, as shown in FIG. 11. The acts shown in FIG. 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 11. In some embodiments, a system can be configured to perform the acts of FIG. 11. Alternatively, the acts of FIG. 11 can be performed as part of a computer implemented method.

As mentioned above, FIG. 11 illustrates a flowchart of a series of acts 1100 for generating a cinemagraph in accordance with one or more implementations. While FIG. 11 illustrates acts according to one embodiment, alternative embodiments may omit, add to, reorder, and/or modify any of the acts shown in FIG. 11.

In particular, the series of acts 1100 includes an act 1110 of generating a surface normal map. Specifically, the act 1110 can include generating a surface normal map of an image depicting one or more manipulable objects. Act 1110 can further involve generating the surface normal map of the image depicting the one or more manipulable objects by utilizing a surface normal estimation neural network.

As illustrated, the series of acts 1100 can also include an act 1120 of generating a plurality of warped surface normal maps. In particular, the act 1120 can include generating, utilizing a cyclic animation neural network, a plurality of warped surface normal maps from the surface normal map by modifying surface normals of the one or more manipulable objects in a time dependent sequence. Additionally, the act 1120 can also generating geometrically consistent new wrinkles and folds in the one or more manipulable objects. Act 1120 can involve generating a combination of the first set of deep features and the second set of deep features. Act 1120 can involve conditioning the cyclic animation neural network on a wind direction.

Moreover, as shown in FIG. 11, the series of acts 1100 can include the act 1130 of synthesizing a plurality of modified images. In particular, the act 1130 can include synthesizing a plurality of modified images from the plurality of warped surface normal maps. For example, the act 1130 can include decomposing the image into a reflectance map and a shading map, generating a plurality of new shading maps utilizing the plurality of warped surface normal maps, and combining the reflectance map and each of the warped surface normal maps.

As illustrated, the series of acts 1100 can also include an act 1140 of generating a cinemagraph. In particular, the act 1140 can include generating a cinemagraph from the plurality of modified images. For example, the act 1140 can include generating a cinemagraph that comprises a cyclic animation sequence of movement of the one or more manipulable objects. Furthermore, in some embodiments, the act 1140 includes generating a cinemagraph wherein movement of the one or more manipulable objects is performed without warping a texture of the one or more manipulable objects.

In addition (or in alternative) to the acts described above, the cyclic animation system 106 can also perform the act of extracting features from a digital image depicting one or more manipulable objects utilizing an encoder of the cyclic animation neural network. In some implementations, the cyclic animation system 106 can perform the acts of generating time encodings, generating one or more wind direction encodings, decoding the extracted features together with the time encodings and the one or more wind direction encodings utilizing a decoder of the cyclic animation neural network to generate a plurality of images with the one or more manipulable objects warped in a time dependent sequence based on the wind direction. Additionally, in one or more embodiments the cyclic animation system 106 can perform the act of generating a cinemagraph from the plurality of images that animates the one or more manipulable objects.

Moreover, in one or more embodiments, generating the one or more wind direction encodings comprises generating a unit vector of a direction and encoding the unit vector at a plurality of different scales. Further still, in some embodiments, encoding the unit vector at the plurality of different scales comprises encoding the unit vector utilizing a plurality of neural network layers of different scales.

Moreover, in one or more embodiments, generating the time encodings comprises utilizing sinusoidal functions to generate time encodings of multiple circumferences parameterized by a change in time. Further still, in some embodiments, decoding the extracted features together with the time encodings and the one or more wind direction encodings utilizing the decoder of the cyclic animation neural network comprises combining the extracted features together with the time encodings and the one or more wind direction encodings at different scales and passing the combinations to the decoder via skip links.

Further still, in some embodiments, decoding the extracted features together with the time encodings and the one or more wind direction encodings utilizing the decoder of the cyclic animation neural network to generate the plurality of images comprises generating a plurality of warped surface normal images; and generating the cinemagraph from the plurality of images that animates the one or more manipulable objects comprises generating a plurality of modified images utilizing the plurality of warped surface normal images.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
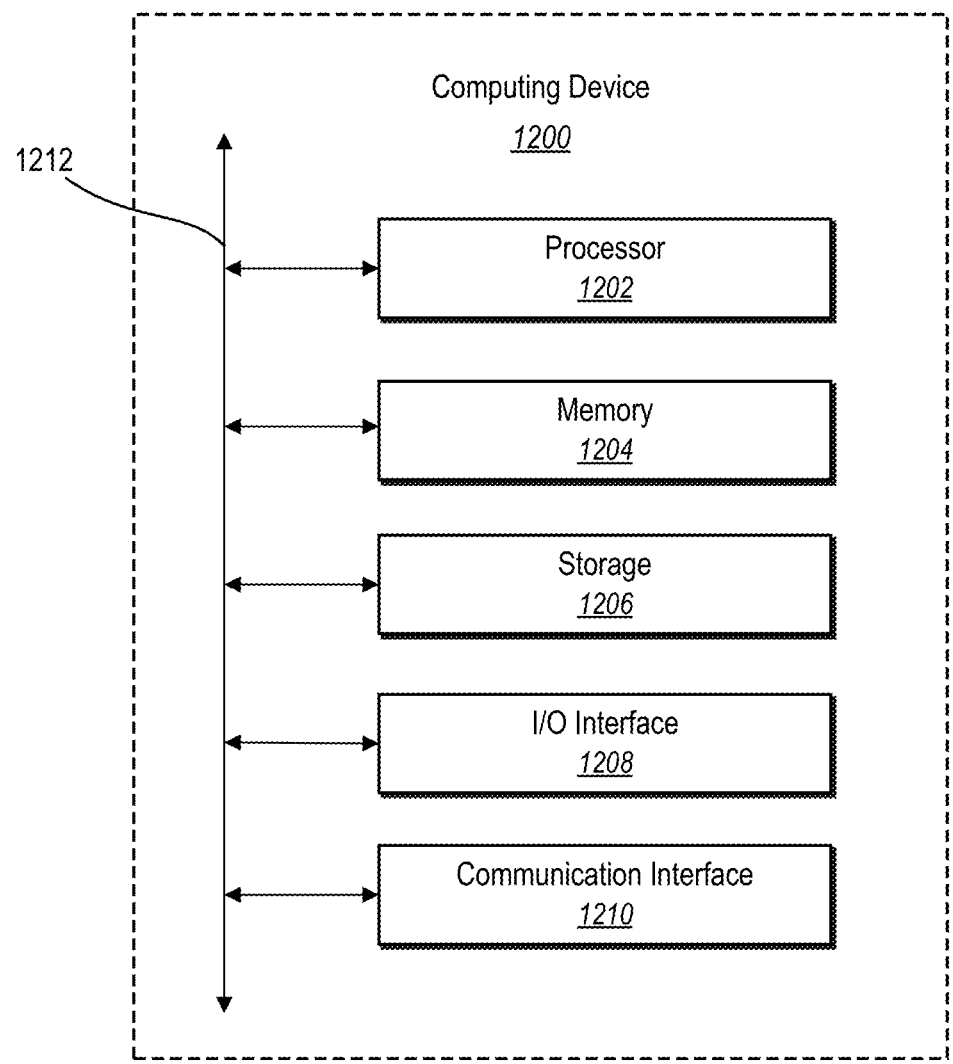
FIG. 12 illustrates a block diagram of an example computing device in accordance with one or more embodiments.

FIG. 12 illustrates, in block diagram form, an example computing device 1200 (e.g., the computing device 1000, the client device 110, and/or the server device(s) 102) that may be configured to perform one or more of the processes described above. One will appreciate that the cyclic animation system 106 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, the processor 1202 includes hardware for executing instructions, such as those making up a computer program. As an example, and not by way of limitation, to execute instructions, the processor 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 which includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

The invention claimed is:

1. A computer-implemented method comprising:
    generating a surface normal map of an image depicting one or more manipulable objects;
    generating, utilizing a cyclic animation neural network, a plurality of warped surface normal maps from the surface normal map by modifying surface normals of the one or more manipulable objects in a time dependent sequence;
    synthesizing a plurality of modified images from the plurality of warped surface normal maps; and
    generating a cinemagraph from the plurality of modified images.

2. The computer-implemented method of claim 1, wherein generating, utilizing the cyclic animation neural network, the plurality of warped surface normal maps by modifying the surface normals of the one or more manipulable objects comprises generating geometrically consistent new wrinkles and folds in the one or more manipulable objects.

3. The computer-implemented method of claim 1, wherein generating, utilizing the cyclic animation neural network, the plurality of warped surface normal maps comprises conditioning the cyclic animation neural network on a wind direction.

4. The computer-implemented method of claim 1, wherein synthesizing the plurality of modified images from the plurality of warped surface normal maps comprises:
    decomposing the image into a reflectance map and a shading map;
    generating a plurality of new shading maps utilizing the plurality of warped surface normal maps; and
    combining the reflectance map and the plurality of warped surface normal maps.

5. The computer-implemented method of claim 1, wherein the cinemagraph comprises a cyclic animation sequence of movement of the one or more manipulable objects.

6. The computer-implemented method of claim 5, wherein movement of the one or more manipulable objects is performed without warping a texture of the one or more manipulable objects.

7. The computer-implemented method of claim 1, wherein generating the surface normal map of the image depicting the one or more manipulable objects comprises utilizing a surface normal estimation neural network.

8. A system comprising:
    one or more memory devices comprising a cyclic animation neural network; and
    one or more processors coupled to the one or more memory devices that cause the system to perform operations comprising:
        extracting features from a digital image depicting one or more manipulable objects utilizing an encoder of the cyclic animation neural network;
        generating time encodings;
        generating one or more wind direction encodings;
        decoding the extracted features together with the time encodings and the one or more wind direction encodings utilizing a decoder of the cyclic animation neural network to generate a plurality of images with the one or more manipulable objects warped in a time dependent sequence based on a wind direction; and
        generating a cinemagraph from the plurality of images that animates the one or more manipulable objects.

9. The system of claim 8, wherein generating the one or more wind direction encodings comprises generating a unit vector of a direction and encoding the unit vector at a plurality of different scales.

10. The system of claim 9, wherein encoding the unit vector at the plurality of different scales comprises encoding the unit vector utilizing a plurality of neural network layers of different scales.

11. The system of claim 8, wherein generating the time encodings comprises utilizing sinusoidal functions to generate time encodings of multiple circumferences parameterized by a change in time.

12. The system of claim 8, wherein decoding the extracted features together with the time encodings and the one or more wind direction encodings utilizing the decoder of the cyclic animation neural network comprises combining the extracted features together with the time encodings and the one or more wind direction encodings at different scales and passing the combinations to the decoder via skip links.

13. The system of claim 8, wherein: decoding the extracted features together with the time encodings and the one or more wind direction encodings utilizing the decoder of the cyclic animation neural network to generate the plurality of images comprises generating a plurality of warped surface normal images; and
    generating the cinemagraph from the plurality of images that animates the one or more manipulable objects comprises generating a plurality of modified images utilizing the plurality of warped surface normal images.

14. The system of claim 8, wherein generating time encodings is based on a predefined period of time.

15. A non-transitory computer-readable medium storing instructions that, when executed by at least one processor, cause the at least one processor to perform operations comprising:
    generating a surface normal map of an image depicting one or more manipulable objects;
    generating, utilizing a cyclic animation neural network, a plurality of warped surface normal maps from the surface normal map by modifying surface normals of the one or more manipulable objects in a time dependent sequence;

synthesizing a plurality of modified images from the plurality of warped surface normal maps; and generating a cinemagraph from the plurality of modified images.

16. The non-transitory computer-readable medium of claim 15, wherein generating, utilizing the cyclic animation neural network, the plurality of warped surface normal maps by modifying the surface normals of the one or more manipulable objects comprises generating geometrically consistent new wrinkles and folds in the one or more manipulable objects.

17. The non-transitory computer-readable medium of claim 15, wherein generating, utilizing the cyclic animation neural network, the plurality of warped surface normal maps comprises conditioning the cyclic animation neural network on a wind direction.

18. The non-transitory computer-readable medium of claim 15, wherein synthesizing the plurality of modified images from the plurality of warped surface normal maps comprises:

decomposing the image into a reflectance map and a shading map;

generating a plurality of new shading maps utilizing the plurality of warped surface normal maps; and combining the reflectance map and the plurality of warped surface normal maps.

19. The non-transitory computer-readable medium of claim 15, wherein:

the cinemagraph comprises a cyclic animation sequence of movement of the one or more manipulable objects.

20. The non-transitory computer-readable medium of claim 19, wherein movement of the one or more manipulable objects is performed without warping a texture of the one or more manipulable objects.

* * * * *